United States Patent [19]

Chung, deceased

[11] Patent Number: 4,495,331
[45] Date of Patent: Jan. 22, 1985

[54] SCAVENGERS FOR RTV SILICONE RUBBER COMPOSITIONS

[75] Inventor: Rack H. Chung, deceased, late of Saratoga County, N.Y., by Betsy A. Chung, executor

[73] Assignee: General Electric Company, Waterford, N.Y.

[21] Appl. No.: 497,780

[22] Filed: May 25, 1983

[51] Int. Cl.$^3$ ................................................ C08K 3/10
[52] U.S. Cl. ................................... 524/783; 524/785; 524/788; 524/789; 524/859; 524/860; 524/865; 525/104; 528/18; 528/28; 528/34; 528/901
[58] Field of Search ............... 524/783, 785, 788, 789, 524/859, 860, 865; 528/28, 34, 18, 901; 525/104

[56] References Cited

U.S. PATENT DOCUMENTS 4,202,807  5/1980  Moretto et al. ........................ 528/28
4,221,896  9/1980  Endo ...................................... 528/28
4,292,423  9/1981  Kaufmann et al. .................... 528/28
4,395,526  7/1983  White et al. .......................... 528/18

Primary Examiner—Melvyn I. Marquis
Attorney, Agent, or Firm—Gary L. Loser

[57] ABSTRACT

There is provided a one package RTV composition which is convertible to a tack-free elastomer comprising:

(A) a polydiorganosiloxane base polymer,
(B) an effective amount of a condensation catalyst, and
(C) a stabilizing amount of organic scavenger for hydroxy groups which has the formula:

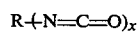

where R is a linear or cyclic aliphatic compound or an aromatic compound, and x equals at least 1.

44 Claims, No Drawings

SCAVENGERS FOR RTV SILICONE RUBBER COMPOSITIONS

BACKGROUND OF THE INVENTION

The present invention relates to one component, alkoxy functional room temperature vulcanizable (RTV) compositions. More particularly, the present invention relates to isocyanate functional organic compounds which are effective as scavengers for chemically combined hydroxy groups in one component, alkoxy functional silicone RTV compositions.

Recently a shelf-stable, fast-curing, one component, alkoxy functional RTV composition was disclosed in the patent of White et al., U.S. Pat. No. 4,395,526, and assigned to the same assignee as the present invention. Basically White et al. disclose that moisture curable, polyalkoxy terminated organopolysiloxane RTV compositions can be made by combining:

(1) a silanol terminated polydiorganosiloxane base polymer,
(2) a crosslinking silane,
(3) an effective amount of certain silane scavengers for chemically combined hydroxy radicals such as methanol, and
(4) an effective amount of a condensation catalyst.

The scavenger, which can be either a separate compound or part of the crosslinking silane, has a functionality selected from the group consisting of amido, amino, carbamato, enoxy, imidato, isocyanato, oximato, thioisocyanato and ureido. The disclosure of White et al. is incorporated by reference into the present application.

Shortly after the pioneering invention of White et al. it was discovered that compounds other than those disclosed by White et al. could be utilized as scavengers for chemically combined hydroxy groups or as integrated scavenger-cross-linkers. For example, Dziark, U.S. Pat. No. 4,417,042, discloses silazanes and silylnitrogen polymers as scavenger compounds; Lucas, Ser. No. 464,443, filed Feb. 7, 1983, discloses novel acetamide functional silane and siloxanes as scavengers; Chung et al., Ser. No. 428,038 filed Sept. 29, 1982, discloses additional silazane scavengers; Chung, Ser. No. 338,518, filed Jan. 11, 1982, now U.S. Pat. No. 4,424,157, discloses silanes having cyclic amide functionality as scavenger compounds; Mitchell, Ser. No. 462,949, filed Feb. 1, 1983, discloses additional amine functional silanes and siloxanes which are effective scavengers and Swiger et al., Ser. No. 476,000, filed Mar. 17, 1983, discloses additional silane and siloxane scavengers. All of the foregoing patent applications are assigned to the same assignee as the present invention and are incorporated by reference into the instant disclosure.

In each of the above cited patent applications it was essential that the scavenger compound include silicon atoms, for example, as silanes, siloxanes or silazanes. Thus, it was quite unexpected that non-silicone compositions could be utilized as hydroxy scavenging agents so as to provide silicone RTV compositions which exhibit excellent shelf stability.

It is therefore an object of the present invention to provide novel hydroxy scavenging agents for use in polyalkoxy-terminated polysiloxane RTV compositions to obtain improved shelf stability.

It is another object of the present invention to provide a method for producing silicone RTV compositions which include the novel hydroxy scavenging agents of the present invention.

Other objects and advantages of the present invention will be obvious from the following detailed description.

SUMMARY OF THE INVENTION

In accordance with the broadest aspects of the present invention there is provided a stable, one package, silicone RTV composition convertible to a tack-free elastomer, comprising:

(A) a polydiorganosiloxane base polymer wherein the silicon atom at each chain end is terminated with at least two alkoxy radicals;
(B) an effective amount of condensation catalyst; and
(C) a stabilizing amount of organic scavenger for hydroxy groups having the formula:

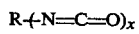

where R is a linear or cyclic aliphatic compound or an aromatic compound and x equals at least 1.

DESCRIPTION OF THE INVENTION

One aspect of the present invention provides a stable, one package, substantially anhydrous and substantially acid-free, room temperature vulcanizable organopolysiloxane composition stable under ambient conditions in the substantial absence of moisture over an extended period of time, and convertible to a tack-free elastomer comprising:

(A) a polydiorganosiloxane base polymer wherein the silicon atom at each chain end is terminated with at least two alkoxy radicals;
(B) an effective amount of condensation catalyst; and
(C) a stabilizing amount of organic scavenger for hydroxy groups having the formula:

where R is selected from the group consisting of aliphatic compounds and where x equals at least 1.

In another aspect of the present invention the RTV composition which is convertible to a tack-free elastomer comprises:

(A) a silanol terminated polydiorganosiloxane base polymer;
(B) an effective amount of condensation catalyst;
(C) a stabilizing amount of organic scavenger for hydroxy groups having the formula:

where R is selected from the group consisting of aliphatic compounds and aromatic compounds, and x equals at least 1;

(D) an effective amount of a crosslinking silane of the formula:

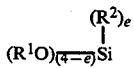

where $R^1$ is a $C_{(1-8)}$ aliphatic organic radical selected from the group consisting of alkyl, alkylether, alkylester, alkylketone and alkylcyano or a $C_{(7-13)}$ aralkyl radical; $R^2$ is a $C_{(1-13)}$ monovalent substituted or unsubstituted hydrocarbon radical; and e equals 0 or 1; and (E) optionally, an effective amount of a co-catalyst or curing accelerator selected from the group consisting of substituted guanidines, amines and mixtures thereof.

The polydiorganosiloxane base polymer, which can be either alkoxy endstopped or silanol endstopped, is well known in the art and can easily be prepared by the skilled artisan. The reader interested in obtaining more detailed information is referred to the patent of White et al., U.S. Pat. No. 4,395,526, which is incorporated herein by reference. For more general information relating to polydiorganosiloxane polymers useful in formulating silicone RTV compositions, the reader is referred to U.S. Pat. Nos. 3,065,194 and 3,127,363 to Nitzsche et al.; 3,133,891 to Ceyzeriat; 3,161,614 and 3,170,894 to Brown et al.; 3,296,161 to Kulpa and 3,296,195 to Goossens, all of which are incorporated herein by reference.

With respect to the condensation catalyst, such catalysts are also well known in the art and a rather exhaustive listing of suitable condensation catalysts is provided in the specification of White et al. However, it should be noted that tin compounds are the preferred condensation catalysts and that dibutyltindiacetate is the most preferred condensation catalyst.

The present invention resides in the surprising discovery that an organic compound, as opposed to a silicone compound, can be utilized as a scavenger for chemically combined hydroxy groups such as methanol and water. Organic scavengers within the scope of the present invention have the general formula:

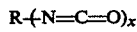

where R is selected from the group consisting of aliphatic compounds and aromatic compounds, and x equals at least 1.

Aliphatic compounds within the scope of R can be either linear or cyclic. Additionally, such compounds can be substituted or unsubstituted. The preferred linear alkanes have from 1 to about 13 carbon atoms and the preferred cyclic alkanes have from 5 to about 13 carbon atoms. Of course, branched linear alkanes or cyclic alkanes having alkyl radicals are also within the scope of the present invention. Thus, included among the preferred alkanes are methane, ethane, propane, butane, pentane, hexane, cyclopentane, cyclhexane, cycloheptane, 2-methylpentane, 2,2,4-trimethyl pentane, methylcyclohexane and the like.

Olefinic compounds, i.e. alkenes and alkynes, within the scope of R can also be substituted or unsubstituted, and linear or cyclic compounds. The preferred linear olefinic compounds contain from 2 to about 13 carbon atoms, and the preferred cyclic olefinic compounds contain from 5 to about 13 carbon atoms. There can be present in such olefinic compounds only double bonds, only triple bonds or mixtures thereof. Preferably there are only one or two multiple bonds in the molecule and most preferably only one multiple bond. Again, the linear olefins can have linear radicals attached thereto. Accordingly, among the preferred olefinic compounds within the scope of R are ethylene, propylene, 1-butene, 2-butene, isobutylene, 3,3-dimethyl-1-butene, cyclopentene, cyclohexene, cycloheptene, 3,5-dimethylcyclopentene, 1,3-butadiene, 1,4-pentadiene, 1,3,5-hexatriene, 2,3-dimethyl-1,3-butadiene, 1,3-cyclopentadiene, 1,3-cyclohexadiene, acetylene, propyne, 1-butyne, 2-pentyne, 3-methyl-1-butyne, and the like.

Aromatic compounds within the scope of R can be mononuclear or polynuclear, however, it is preferred that mononuclear aromatic compounds be employed. Accordingly, the preferred aromatic compounds have from 6 to 10 carbon atoms, for example, benzene, toluene, xylene, styrene, 3-phenylpropene, and the like.

In order to obtain a scavenger compound within the scope of the present invention it is essential that at least one isocyanate radical be bonded to the R compounds described above. While it is desirable to have as many isocyanate radicals as possible attached to a given R compound since it is the isocyanate which scavenges hydroxy radicals, for practical purposes there are generally 1 or 2 isocyanate radicals per linear molecule and 1, 2 or 3 isocyanate radicals per cyclic molecule.

The spatial relationship of one isocyanate radical to another isocyanate radical in the same molecule is not critical. Thus, for example, ortho-diisocyanatobenzene is as preferable as meta-diisocyanatobenzene which in turn is as preferable as para-diisocyanatobenzene. Further, this is true for linear scavengers within the scope of the present invention, for example, 1,1-diisocyanatopropane is as preferable as 1,2-diisocyanatopropane which is as preferable as 1,3-diisocyanatopropane.

It is believed that scavengers of the present invention operate as follows to accept hydroxy groups, particularly chemically combined hydroxy groups such as methanol and water, and thus provide an RTV composition which exhibits excellent shelf stability:

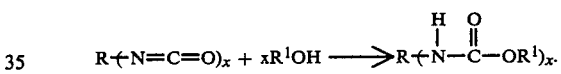

When the polydiorganosiloxane base polymer is silanol endstopped it is necessary to further include in the RTV compositions of the present invention an effective amount of crosslinking silane of the formula:

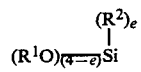

where $R^1$ is a $C_{(1-8)}$ aliphatic organic radical selected from the group consisting of alkyl, alkylether, alkylester, alkylketone and alkylcyano or a $C_{(7-13)}$ aralkyl radical; $R^2$ is a $C_{(1-13)}$ monovalent substituted or unsubstituted hydrocarbon radical; and e equals 0 or 1. Included among the crosslinking polyalkoxysilanes of the above formula are methyltrimethoxysilane, methyltriethoxysilane, ethyltrimethoxysilane, and vinyltrimethoxysilane. The purpose of such crosslinking silane is to provide a polyalkoxy terminated base polymer which will cure upon exposure to atmospheric moisture to a tack-free elastomer. This is also well known in the art and hence the reader interested in obtaining additional information is referred to the patent of White et al.

In order to transform the silanol terminated base polymer into a polyalkoxy terminated base polymer it is desirable to include in the composition a curing accelerator or co-catalyst selected from the group consisting of substituted guanidines, amines and mixtures thereof. Again, the reader who desires additional information is referred to the patent of White et al.

In order that those skilled in the art might be better able to practice the present invention, the following examples are given by way of illustration and not by way of limitation.

EXAMPLES

EXAMPLE 1

Isophoronediisocyanate, e.g.

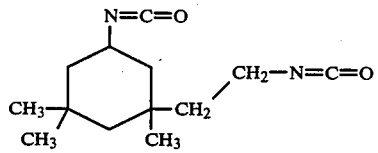

was compounded with methyldimethoxy terminated polymer, butylated guanidine and dibutyltindiacetate under anhydrous conditions using a Semkit ® mixer. A two step catalyzation was employed as follows:

| | |
|---|---|
| 100 g dimethoxy endcapped polymer | First Mix |
| 0.35 g tetramethylbutylguanidine | 15 min. at |
| 0.5, 1.0, 1.5 g isophoronediisocyanate | room temperature |
| 0.25 g dibutyltindiacetate | Second Mix |
| 1.0 g trimethyl stopped silicone carrier fluid | 15 min. at room temperature |

After mixing, the RTV compositions were packaged into sealed aluminum tubes and stored for 24 hours at room temperature, 24 hours at 100° C., 48 hours at room temperature, 48 hours at 100° C., and 72 hours at 100° C. At the end of the respective aging periods, the compositions were cured at room temperature and 50% relative humidity. Speed of cure was determined by tack-free-time (TFT). The results are provided in Table I.

TABLE I

| Isophorone Diisocyanate (g) | Initial | TFT (min.) R.T./ 24 hrs. | 100°/ 24 hrs. | R.T. 48 hrs. | 100°/ 48 hrs. | 100°/ 72 hrs. |
|---|---|---|---|---|---|---|
| 0.5 | 20 | 25 | 15 | 25 | 20 | 40 |
| 1.0 | 20 | 25 | 20 | 25 | 25 | 20 |
| 1.5 | 20 | 20 | — | — | — | 15 |

This example illustrates that by utilizing an organic isocyanate functional compound as a scavenger for chemically combined hydroxy groups, an elastomer is obtained which cures to a tack-free surface in an acceptable period of time.

EXAMPLE 2

In this example the present invention is illustrated as a scavenger for chemically combined hydroxy groups wherein the diorganopolysiloxane base polymer is silanol terminated. Following the compounding procedure of Example 1, the following formulation was prepared:

| | |
|---|---|
| 100 g silanol terminated polymer | First mix |
| 0.35 g tetramethylbutylguanidine | 15 min. at |
| 3.0 g methyltrimethoxysilane | room temperature |
| 2.0 g isophoronediisocyanate | Second Mix |
| 0.25 g dibutyltindiacetate | 15 min. at |
| 1.0 g trimethyl stopped silicone carrier fluid | room temperature |

Test samples were prepared in accordance with the procedure of Example 1 and the results are set forth in Table II.

TABLE II

| | TFT (Min.) | | | | |
|---|---|---|---|---|---|
| Initial | R.T./ 24 hrs. | 100°/ 24 hrs. | R.T./ 48 hrs. | 100°/ 48 hrs. | 100°/ 72 hrs. |
| 20 | 25 | 40 | 25 | 60 | 40 |

These results show that utilizing an organic isocyanate functional compound as a scavenger for chemically combined hydroxy groups when the base polymer is silanol terminated still results in an elastomer having an acceptable tack free time.

EXAMPLE 3

In this example a different scavenger within the scope of the present invention is illustrated. Following the compounding procedure of Example 1, the following formulation was prepared:

| | |
|---|---|
| 100 g methyldimethoxy capped polymer | First Mix |
| 1.5 g tolylene-2,4-diisocyanate | 15 min. at room temperature |
| 0.35 g tetramethylbutylguanidine | Second Mix |
| 0.25 g dibutyltindiacetate | 15 min. at |
| 1.0 g trimethyl stopped silicone carrier fluid | room temperature |

Test samples were again prepared in accordance with the procedure of Example 1 and the results obtained are provided in Table III.

TABLE III

| | TFT (min.) | |
|---|---|---|
| Initial | R.T./24 hrs. | 100°/24 hrs. |
| 55 | 55 | 50 |

I claim:

1. A stable, one package, substantially anhydrous and substantially acid-free, room temperature vulcanizable organopolysiloxane composition stable under ambient conditions in the substantial absence of moisture over an extended period of time and convertible to a tack-free elastomer, comprising:
   (A) a polydiorganosiloxane base polymer wherein the silicon atom at each chain end is terminated with at least two alkoxy radicals;
   (B) an effective amount of condensation catalyst; and
   (C) a stabilizing amount of organic scavenger for hydroxy groups which has the formula:

R$-$(N$=$C$=$O)$_x$ 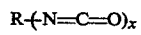

where R is a linear or cyclic aliphatic group or an aromatic group, and x equals at least 1.

2. A stable, one package, substantially anhydrous and substantially acid free, room temperature vulcanizable organopolysiloxane composition stable under ambient conditions in the substantial absence of moisture over an extended period of time and convertible to a tack-free elastomer, comprising:
   (A) a silanol terminated polydiorganosiloxane base polymer;
   (B) an effective amount of condensation catalyst;
   (C) a stabilizing amount of organic scavenger for hydroxy groups which has the formula:

$$R\text{-}(N=C=O)_x$$

where R is a linear or cyclic aliphatic group or an aromatic group and x equals at least 1; and (D) an effective amount of crosslinking silane of the formula $$(R^1O)_{(4-e)}\overset{(R^2)_e}{\underset{}{Si}}$$

where $R^1$ is a $C_{(1-8)}$ aliphatic organic radical selected from the group consisting of alkyl, alkylether, alkylester, alkylketone and alkylcyano or a $C_{(7-13)}$ aralkyl radical; $R^2$ is a $C_{(1-13)}$ monovalent substituted or unsubstituted hydrocarbon radical; and e equals 0 or 1.

3. The composition of claim 1 further comprising an effective amount of curing accelerator selected from the group consisting of substituted guanidines, amines and mixtures thereof.

4. The composition of claim 1 wherein the condensation catalyst is a tin compound.

5. The composition of claim 4 wherein the tin compound is dibutyltindiacetate.

6. The composition of claim 3 wherein the curing accelerator is tetramethylbutylguanidine.

7. The composition of claim 1 wherein R is a linear alkyl group having from 1 to about 13 carbon atoms.

8. The composition of claim 7 wherein x equals 1 or 2.

9. The composition of claim 1 wherein R is a cyclic alkyl group having from about 5 to about 13 carbon atoms.

10. The composition of claim 9 wherein x equals 1, 2 or 3.

11. The composition of claim 1 wherein R is a linear olefinic group having from about 2 to about 13 carbon atoms.

12. The composition of claim 11 wherein x equals 1 or 2.

13. The composition of claim 1 wherein R is a cyclic olefin group having from about 5 to about 13 carbon atoms.

14. The composition of claim 13 wherein x equals 1, 2 or 3.

15. The composition of claim 1 wherein R is an aromatic group having from about 5 to about 13 carbon atoms.

16. The composition of claim 15 wherein x equals 1, 2 or 3.

17. The composition of claim 1 wherein the scavenger for hydroxy functional groups is isophoronediisocyanate.

18. The composition of claim 1 wherein the scavenger for hydroxy functional groups is tolylene-2,4-diisocyanate.

19. The composition of claim 1 further comprising up to about 700 parts by weight filler.

20. The composition of claim 19 wherein the filler is selected from the group consisting of titanium dioxide, zirconium silicate, silica aerogel, iron oxide, diatomaceous earth, fumed silica, carbon black, precipitated silica, glass fibers, polyvinylchloride, ground quartz and calcium carbonate.

21. The composition of claim 1 further comprising an effective amount of an adhesion promoter.

22. The composition of claim 1 further comprising an effective amount of sag control agent.

23. The composition of claim 1 further comprising an effective amount of plasticizer.

24. A method for making a one package, substantially anhydrous and substantially acid-free room temperature vulcanizable composition curable to the solid elastomeric state, which method comprises agitating under substantially anhydrous conditions at a temperature in the range of from 0° C. to 180° C., a room temperature vulcanizable material selected from:

(i) a mixture comprising:
(a) 100 parts of a silanol terminated polydiorganosiloxane consisting essentially of chemically combined units of the formula:

$$-\underset{R^3}{\overset{R^3}{\underset{|}{\overset{|}{Si}}}}O-,$$

(b) an effective amount of a condensation catalyst,
(c) a stabilizing amount of an organic scavenger for hydroxy functional groups of the formula:

$$R\text{-}(N=C=O)_x$$

(d) an effective amount of a crosslinking silane of the formula:

$$(R^1O)_{(4-e)}\overset{(R^2)_e}{\underset{}{Si}}$$

(e) 0–5 parts of a curing accelerator selected from the group consisting of substituted guanidines, amines and mixtures thereof; and (ii) a mixture comprising:
(a) 100 parts of a polydiorganosiloxane base polymer wherein the silicon atom at each chain end is terminated with at least two alkoxy groups,
(b) an effective amount of a condensation catalyst,
(c) a stabilizing amount of an organic scavenger for hydroxy functional groups of the formula:

$$R\text{-}(N=C=O)_x$$

(d) 0–10 parts of a crosslinking silane of the formula:

$$(R^1O)_{(4-e)}\overset{(R^2)_e}{\underset{}{Si}}$$

(e) 0–5 parts of a curing accelerator selected from the group consisting of substituted guanidines, amines and mixtures thereof;

where R is a linear or cyclic aliphatic group or an aromatic group, $R^1$ is a $C_{(1-8)}$ aliphatic organic radical selected from the group consisting of alkyl, alkylether, alkylester, alkylketone, and alkylcyano or a $C_{(7-13)}$ aralkyl radical, $R^2$ and $R^3$ are independently selected monovalent substituted or unsubstituted hydrocarbon radicals having 1 to 13 carbon atoms, e equals 0 or 1 and x equals at least 1.

25. The method of claim 24 wherein the condensation catalyst is a tin compound.

26. The method of claim 25 wherein the tin compound is dibutyltindiacetate.

27. The method of claim 24 wherein the curing accelerator is tetramethylbutylguanidine.

28. The method of claim 24 wherein R is a linear alkyl group having from 1 to about 13 carbon atoms.

29. The method of claim 28 wherein x equals 1 or 2.

30. The method of claim 24 wherein R is a cyclic alkyl group having from about 5 to about 13 carbon atoms.

31. The method of claim 30 wherein x equals 1, 2 or 3.

32. The method of claim 24 wherein R is a linear olefinic group having from about 2 to about 13 carbon atoms.

33. The method of claim 32 wherein x equals 1 or 2.

34. The method of claim 24 wherein R is a cyclic olefinic group having from about 5 to about 13 carbon atoms.

35. The method of claim 34 wherein x equals 1, 2 or 3.

36. The method of claim 24 wherein R is an aromatic group having from about 5 to about 13 carbon atoms.

37. The method of claim 36 wherein x equals 1, 2 or 3.

38. The method of claim 24 wherein the organic scavenger for hydroxy functional groups is isophoronediisocyanate.

39. The method of claim 24 wherein the organic scavenger for hydroxy functional groups is tolylene-2,4-diisocyanate.

40. The method of claim 24 further comprising up to about 700 parts by weight filler.

41. The method of claim 40 wherein the filler is selected from the group consisting of titanium dioxide, zirconium silicate, silica aerogel, iron oxide, diatomaceous earth, fumed silica, carbon black, precipitated silica, glass fibers, polyvinylchloride, ground quartz and calcium carbonate.

42. The method of claim 24 further comprising an effective amount of an adhesion promoter.

43. The method of claim 24 further comprising an effective amount of a sag control agent.

44. The method of claim 24 further comprising an effective amount of plasticizer.

* * * * *